United States Patent [19]
Sehier et al.

[11] Patent Number: 5,278,867
[45] Date of Patent: Jan. 11, 1994

[54] RECEIVER SYSTEM FOR PROCESSING SIGNALS RECEIVED ON DIVERSITY CHANNELS

[75] Inventors: Philippe Sehier; Alain Gressier, both of Levallois-Perret, France

[73] Assignee: Alcatel Telspace, Nanterre Cedex, France

[21] Appl. No.: 810,890

[22] Filed: Dec. 20, 1991

[30] Foreign Application Priority Data
Dec. 21, 1990 [FR] France ............... 9016114

[51] Int. Cl.⁵ .......................................... H03H 7/30
[52] U.S. Cl. ...................................... 375/14; 375/100; 375/111; 364/724.2
[58] Field of Search ............... 375/14, 80, 97, 100, 375/106, 111, 102, 11; 364/724.2; 333/18, 28

[56] References Cited

U.S. PATENT DOCUMENTS

| | | | |
|---|---|---|---|
| 3,879,664 | 4/1975 | Monsen | 325/303 |
| 3,962,637 | 6/1976 | Motley et al. | 375/14 |
| 4,295,222 | 10/1981 | Van Uffelen | 375/106 |
| 4,862,484 | 8/1989 | Roberts | 375/14 |

FOREIGN PATENT DOCUMENTS

| | | | |
|---|---|---|---|
| 0279080 | 8/1988 | European Pat. Off. | H04B 7/08 |
| 0396101 | 11/1990 | European Pat. Off. | H04L 1/06 |

Primary Examiner—Curtis Kuntz
Assistant Examiner—Don N. Vo
Attorney, Agent, or Firm—Sughrue, Mion, Zinn, Macpeak & Seas

[57] ABSTRACT

A receiver system processes signals transmitted via a multipath dispersive transmission medium. It includes a device for digitizing the received signals to supply corresponding digital signals. An adaptive digital equalizer responsive to the digital signals supplies information symbols. A symbol-clock signal controls the digitizer and the equalizer. A timing signal recovery device responsive to the digital signals and to the information symbols derives a phase control signal for controlling the phase of the symbol-clock signal.

3 Claims, 2 Drawing Sheets

RECEIVER SYSTEM FOR PROCESSING SIGNALS RECEIVED ON DIVERSITY CHANNELS

BACKGROUND OF THE INVENTION

1. Field of the invention

The field of the invention is that of signal transmission systems, in particular systems transmitting digital signals modulated by a form of modulation such as Quadrature Phase Shift Keying (QPSK) in which the signals are transmitted over a multipath dispersive medium.

The invention is more particularly concerned with a receiver system for processing signals transmitted over a multipath dispersive medium and received on a plurality of diversity channels.

2. Description of the prior art

It is standard practice to use adaptive digital equalizers in receiver systems to minimize the disturbing effects of the transmission medium. In particular, multipath propagation of signals generates inter-symbol interference. This is the case with transmission by a line of sight or tropospheric microwave beam, for example. The signal received by the receiver system is then the time-varying weighted sum of differently delayed different replicas of the transmitted signal.

Digital equalizers are usually implemented in the form of digital tranversal filters with multiple coefficients and corresponding symbol taps. Adaptive digital equalizers may incorporate a backward decision filter which offers an improvement in performance, especially on media subject to severe distortion.

The performance of an adaptive digital equalizer is critically dependent on the phase of the symbol-clock signal regenerated locally in the receiver to digitize the demodulated received signals and to clock the digital equalizer at the same rate as the digitized complex samples.

Known adaptive digital equalizers include oversampling adaptive digital equalizers in which the demodulated received signal is sampled at a frequency which is a multiple of the symbol-clock signal frequency. Oversampling adaptive digital equalizers comprise digital filters adapted to vary their group propagation time according to the phase of the symbol-clock signal using algorithms such as the stochastic gradient algorithm, for example, to calculate coefficients of the digital transversal filters which automatically compensate phase errors of the symbol-clock signal.

In practice, however, it is found that this advantageous feature of oversampling adaptive digital equalizers is not sufficient to compensate for serious phase errors in the regenerated symbol-clock signal because the number of coefficients of the digital filters is necessarily limited. Consequently it is necessary to provide a symbol-clock signal control device to monitor and correct the phase of the symbol-clock signal to ensure correct operation of the digital equalizer.

The document IEEE TRANSACTIONS ON COMMUNICATION, vol.COM-24, N° 8, AUGUST 1976, pages 856-863 discloses a receiver system comprising an oversampling adaptive digital equalizer and a timing recovery device controlling means for generating a symbol-clock signal. The timing recovery device derives a phase control signal from the coefficients of the transversal filter of the adaptive digital equalizer to control the phase of the generated symbol-clock signal. The control signal is representative of the weighted sum of the coefficients of the equalizer filter. This weighted sum is expressed by the equation:

$$D = - \sum_{i=1}^{M} |C_i|^2 + \sum_{i=M+1}^{N} |C_i|^2$$

in which M has a selected value slightly greater than N/2. Thus movement of the coefficients of the filter causes the value D to vary either side of the null value. The value D is filtered to form the phase control signal which controls the phase of the symbol-clock signal.

However, it has been found that the performance of the clock recovery device remains mediocre because the range of adjustment, in terms of bandwidth, of the phase of the symbol-clock signal is essentially limited by the loop bandwidth of the digital equalizer, which is a few hertz.

What is more, the performance of the equalizer is degraded because the phase control signal is generated from the movement of the coefficients of the equalizer filter, which must adapt to random variations in the phase of the symbol-clock signal, whereas the transmission medium may remain stable. This leads to the selection of costly highly stable clocks.

Finally, this timing recovery device is not suitable for a digital equalizer with multiple diversity channels comprising multiple digital transversal filters. The above equation caters for only one diversity channel and it would not seem possible to expand this equation to cover multiple diversity channels.

An object of the invention is therefore to alleviate the aforementioned drawbacks and in particular to solve the problem of symbol-timing recovery in a receiver system comprising an adaptive digital equalizer with multiple diversity channels.

SUMMARY OF THE INVENTION

The present invention consists in a receiver system for processing signals transmitted via a multipath dispersive transmission medium, said receiving system including means for digitizing the received signals to supply corresponding digital signals, adaptive digital equalization means responsive to said digital signals for supplying information symbols, means for producing a symbol-clock signal controlling said digitizer means and said equalizer means and means for recovering a timing signal responsive to said digital signals and to said information symbols in order to derive a phase control signal for controlling the phase of said symbol-clock signal.

Other features and advantages of the invention will emerge more clearly from the following description of one example of the invention given with reference to the appended drawings.

DETAILED DESCRIPTION OF THE INVENTION

The receiver system in accordance with the invention is designed to process digital signals modulated by QPSK modulation, for example, transmitted over a multipath dispersive medium. A signal transmitted by a transmitter is received by the receiver in the form of a plurality of replicas of the transmitted signal, these replicas being received on diversity channels of the receiver system.

Figure 1:
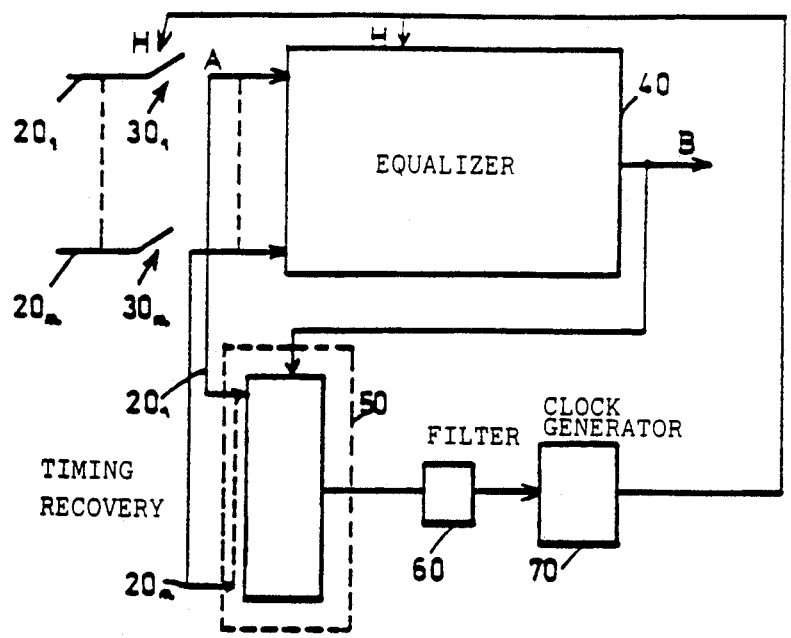
FIG. 1 is a diagram showing a receiver system comprising a diversity adaptive digital equalizer and a timing recovery device in accordance with the invention.

Referring to FIG. 1, in a conventional manner the receiver system comprises demodulators (not shown) to demodulate the replicas of the transmitted signal and to supply demodulated received signals, converters $30_1$ through $30_n$ receiving at their input the demodulated signals received via the diversity channels $20_1$ through $20_n$ and adapted to digitize the demodulated received signals to form complex samples A, an adaptive digital equalizer 40 receiving the digitized signals on diversity channels at its input and supplying complex information symbols B such as decided symbols or reference symbols, timing recovery means 50 and generator means 70 for generating a controlled phase symbol-clock signal H, the symbol-clock signal H controlling the analog-digital converter means and the digital equalizer. In what follows A represents a signal sampled at intervals of k.T/2 in which T represents the symbol time.

The symbol-clock signal generator means 70 (receiver clock) is advantageously a voltage/frequency or like controlled oscillator having a control input controlling the phase of the symbol-clock signal generated.

The timing recovery device 50 derives a phase control signal via a matched shaping filter 60 by processing the digital signals (samples A) and the information symbols B. The phase control signal is applied to the control input of the clock generator 70 to control the phase of the symbol-clock signal and to correct symbol-clock signal phase errors.

Figure 2:
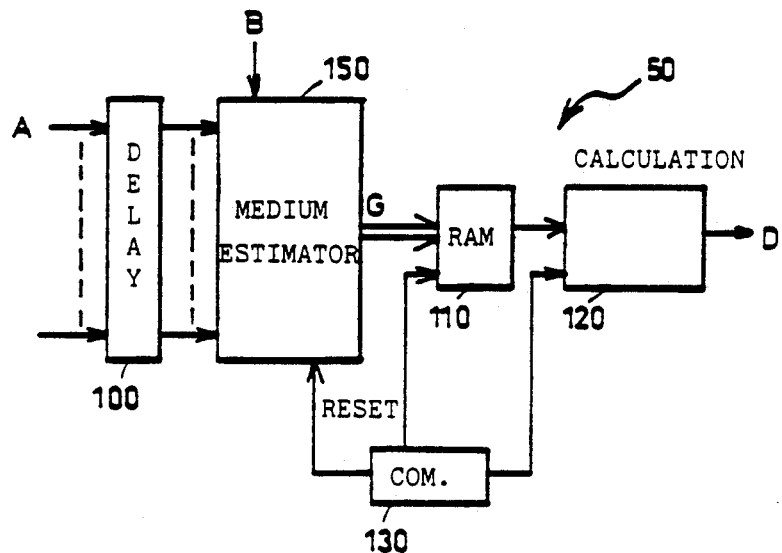
FIG. 2 is a diagram showing the structure of the timing recovery device in accordance with the invention which includes a medium estimator.

The timing recovery device in accordance with the invention is shown in more detail in FIG. 2. It comprises a medium estimator 150 responsive to the complex samples A and to the complex information symbols B (decided or referenced) to supply complex estimate samples G of the impulse response of the medium for each diversity channel, a buffer RAM 110 for storing the complex estimate samples for a predetermined period and a microprocessor or like calculation means 120 for operating on the stored estimate samples.

It must be understood that the impulse response of the medium must be estimated over a certain number of information symbols to be sufficiently representative of the quality of the medium. Also, the impulse response of the medium is estimated at regular intervals under the control of control means 130 adapted to synchronize the medium estimator 150, the buffer 110 and the calculation means 120.

Figure 3:
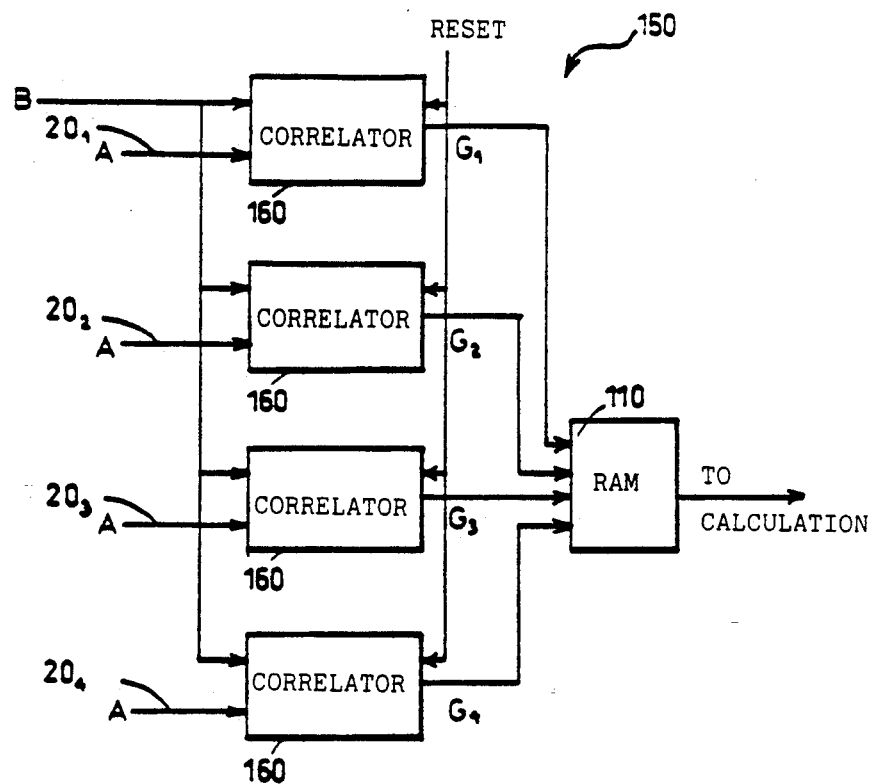
FIG. 3 is a diagram showing the structure of the medium estimator which includes correlators.

The impulse response of the medium is the result of convolution of the transmit filter, the transmission medium and the receive filter. Consequently, the medium estimator means 150 supplies estimate samples for each diversity channel at times which are multiples of a symbol half-time (k.T/2). FIG. 3 is a diagram showing one embodiment of a medium estimator for QPSK modulation which comprises a battery of correlators 160 each assigned to one diversity channel 20 (four are shown in the figure). Each correlator 160 receives the information symbols B at times which are multiples of the symbol time (kT) and samples A from the corresponding diversity channel at times which are multiples of a symbol half-time (k.T/2) and supplies the estimate samples G1, G2, G5, G4. If it is assumed that the estimate samples G are obtained for a large number of symbols B, the output of the correlators 160 may be used directly as a medium estimate without deteriorating the performance of the timing recovery loop. The estimate timing requirement for controlling the symbol-clock signal is very small in relation to the information symbol timing requirement.

Figure 4:
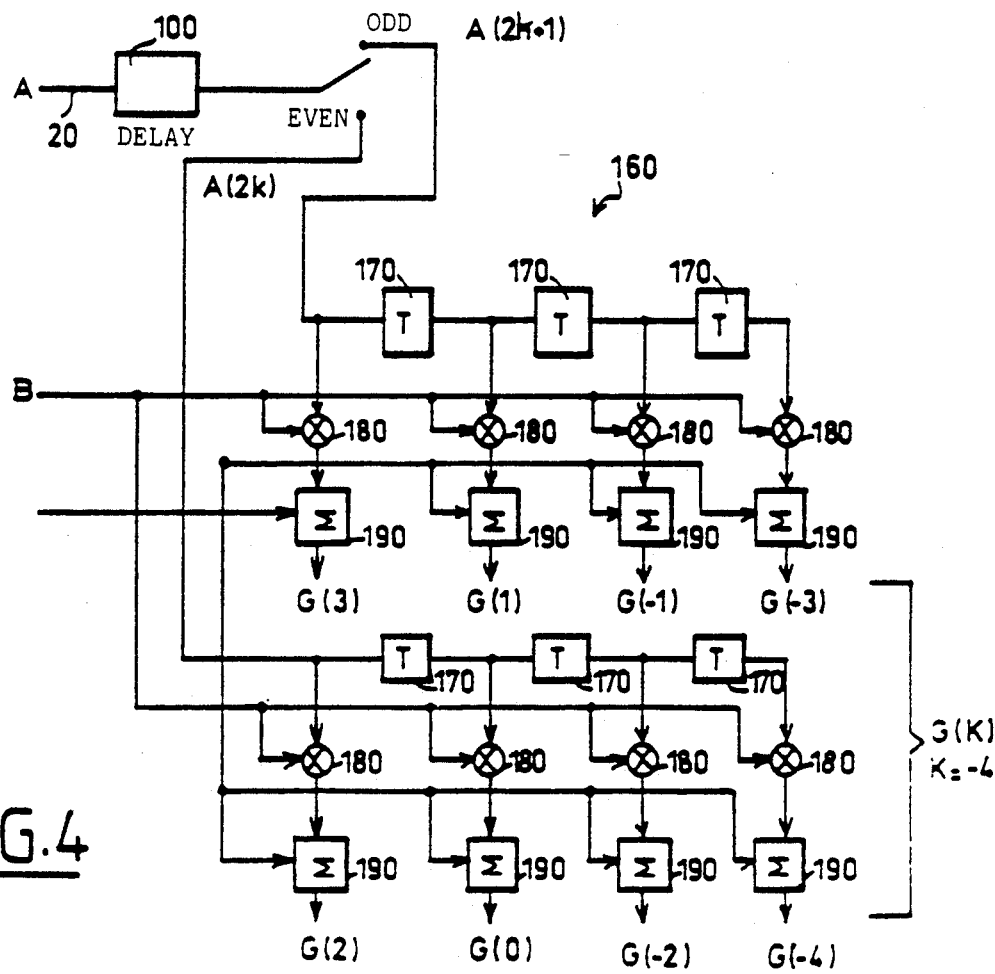
FIG. 4 is a diagram showing the structure of a correlator.

FIG. 4 shows a simplified correlator 160 suitable for QPSK modulation. The correlator 160 is constructed in a standard manner around a series of registers 170 for the samples A, a series of multipliers 180 and a series of integrators 190 whose operation will not be described hereinafter as it is well known to one skilled in the art. The figure also shows time-delay means 100 associated with a diversity channel 20 to delay the complex samples A by a time which is adjusted so that the correlator 160 supplies the highest energy of the impulse response of the medium for the channel in question. Consequently, the time-delay means 100 are adapted to position the complex samples A in the analysis window of the correlators 160, that is to say to adjust the complex samples A substantially into corresponding temporal relationship with the information symbols B.

The correlator 160 receives at its input the delayed samples A divided into even rank samples A(2k) and odd rank samples A(2k+1) and the decided or reference symbols corresponding to the delayed samples. It supplies a set of medium estimate samples for the channel in question. The correlator shown in FIG. 4 comprises eight integrators 190 which each deliver medium estimate components G(k) for values of k running from $-4$ to 3, k representing the rank of the sample A tap.

At the beginning of the medium estimation, the control means 160 reset the integrators 190 of the correlators 160 by means of a RESET command. During a sufficiently long sequence of information symbols B the integrators 190 accumulate the result of multiplying the complex samples A(2k+1) or A(2k) by the complex information symbols B. In the case shown in FIGS. 3 and 4 the medium estimator 150 delivers 32 estimate samples G(k), eight for each correlator. The estimate samples G(k) are stored in the buffer 110.

Hereinafter G1(k), G2(k), G3(k), etc designate the estimate sample located at k.T/2 from the respective impulse response estimate for channel 1, channel 2, channel 3, etc.

The calculation means 120 is adapted to extract the value of the estimate samples from the buffer 110 and to calculate the expression:

$$D = \frac{\sum_{k=-4}^{3} k \cdot [|G_1(k)|^2 + \ldots + |G_4(k)|^2]}{\sum_{k=-4}^{3} |G_1(k)|^2 + \ldots + |G_4(k)|^2}$$

Values of D to either side of the null value represent a symbol-clock signal phase error. Of course, this expression is given for four diversity channels but it could readily be generalized to suit a greater number of diversity channels. Also, tests have shown that the above expression for D can be simplified by eliminating the denominator without making it unreliable. It may also be remarked that the phase error value is a linear combination of the moduli of the complex medium estimate values taken for a plurality of information symbols.

The error value D calculated by the calculation means 120 is filtered by a filter 60 to provide the control signal which controls the phase of the symbol-clock signal. The timing recovery system in accordance with the invention enables receiver clock acquisition and synchronization even if the transmitted signal is highly disrupted by the medium or there is strong fading on one of the diversity channels. What is more, the timing recovery device in accordance with the invention adds very little complexity to the receiver system given that it is implemented around a device identical to that used to control the filter coefficients of the adaptive digital equalizer.

There is claimed:

1. A receiving system for processing signals transmitted via a multipath dispersive transmission medium, said receiving system comprising:
   means for digitizing signals received on diversity channels of said receiver system to output corresponding digital signals;
   adaptive digital equalization means responsive to said digital signals for outputting information symbols;
   means for producing a symbol-clock signal for controlling said means for digitizing and said adaptive digital equalizer means; and
   means, coupled to said means for producing and responsive to said digital signals and to said information symbols, for recovering a timing signal in order to derive a phase control signal for controlling the phase of said symbol-clock signal;
   wherein said timing signal recovery means comprises:
   means for estimating an impulse response of the multipath dispersive transmission medium for each of said diversity channels in order to supply complex medium estimate values;
   means for calculating symbol-phase error values from said complex medium estimate values; and
   means for deriving said phase control signal from said symbol-phase error values.

2. The receiver system according to claim 1, wherein said means for recovering timing signal further includes time-delay means located at the input of the means for estimating for bringing said digital signals into correct timing correspondence with said information symbols.

3. The receiver system according to claim 1, wherein said means for calculating is arranged to calculate the symbol-phase error values from a linear combination of moduli of the complex medium estimate values for a plurality of information symbols.

* * * * *